Aug. 23, 1966  W. A. ALEXANDER  3,268,803
APPARATUS FOR THE INTEGRATION AND STORAGE OF ELECTRICAL SIGNALS
Filed Nov. 15, 1962  3 Sheets-Sheet 1

Warren A. Alexander  INVENTOR.

BY Gary C. Honeycutt
ATTORNEY

Aug. 23, 1966  W. A. ALEXANDER  3,268,803
APPARATUS FOR THE INTEGRATION AND STORAGE OF ELECTRICAL SIGNALS
Filed Nov. 15, 1962  3 Sheets-Sheet 2

Warren A. Alexander  INVENTOR.

BY Gary C. Honeycutt
ATTORNEY

Warren A. Alexander INVENTOR.

BY Gary C. Honeycutt
ATTORNEY

United States Patent Office 3,268,803
Patented August 23, 1966

3,268,803
APPARATUS FOR THE INTEGRATION AND STORAGE OF ELECTRICAL SIGNALS
Warren A. Alexander, Tulsa, Okla., assignor, by mesne assignments, to Esso Production Research Company, Houston, Tex., a corporation of Delaware
Filed Nov. 15, 1962, Ser. No. 237,884
13 Claims. (Cl. 324—29)

This invention relates to a new electrolytic-magnetic circuit element which integrates an electrical signal or series of signals applied thereto, and stores a value which is proportional to the integral.

In its simplest form the device is composed of a magnetic circuit at least partially immersed in the bath of an electrolytic cell. The magnetic circuit consists essentially of a magnetic core, the immersed portion of which is provided with a narrow air gap. Also immersed in the bath are two electrodes, one of which is non-magnetic and is located at least partially within the air gap of the magnetic circuit. The other electrode is composed of a ferromagnetic element. The essential ingredient of the electrolytic bath is a dissolved salt of a ferromagnetic element.

In an electroplating process wherein a ferromagnetic element is converted from the ionic form to the metallic form, the change is characterized by a sharp increase in the magnetic susceptibility or permeability of the element. The device of this invention utilizes this change to control the magnetic susceptibility of the immersed magnetic circuit by electrolytically depositing within the air gap of the magnetic circuit an amount of ferromagnetic material which is proportional to the time integral of an electrical signal or series of signals applied to the terminals of the electrodes immersed in the bath. Accordingly, the integral of the signal or series of signals is stored in the form of an electroplate whereby the increase in the magnetic susceptibility of the magnetic circuit or core is proportional to the integral of the signal or signals.

Any suitable readout means may be provided for measuring or sensing the change in magnetic susceptibility or permeability of the magnetic circuit. One such readout means includes an inductance coil wound about one portion of the magnetic core and a bridge circuit for comparing the inductance of the coil with the inductance of a reference coil.

In a preferred embodiment the device of the invention includes a balanced pair of magnetic circuits each of which is at least partially immersed in an electrolytic bath. The immersed portion of each magnetic loop is provided with a narrow air gap. A pair of non-magnetic electrodes, also at least partially immersed in the bath, are positioned, respectively, at least partially within the air gaps of the magnetic loops. The immersed portions of the magnetic circuits are coated with an insulating and waterproofing material. The electrolytic bath contains a dissolved salt of a ferromagnetic element.

As hereinafter explained, the operation of the device results in a condition of imbalance in the magnetic circuits. Any suitable readout means may be provided for measuring and indicating the exact degree of such imbalance. An example of suitable readout means includes a balanced pair of sensing coils wound about equivalent portions of the balanced magnetic circuits. A bridge circuit which includes the two sensing coils is supplied with a bias signal from an alternating current source, whereby the output from the bridge will show the extent of imbalance introduced into the magnetic circuit. The bridge output may be suitably indicated by an ammeter, as the total current is proportional to the time integral of the input signal or signals that were supplied to the device.

Figure 1:
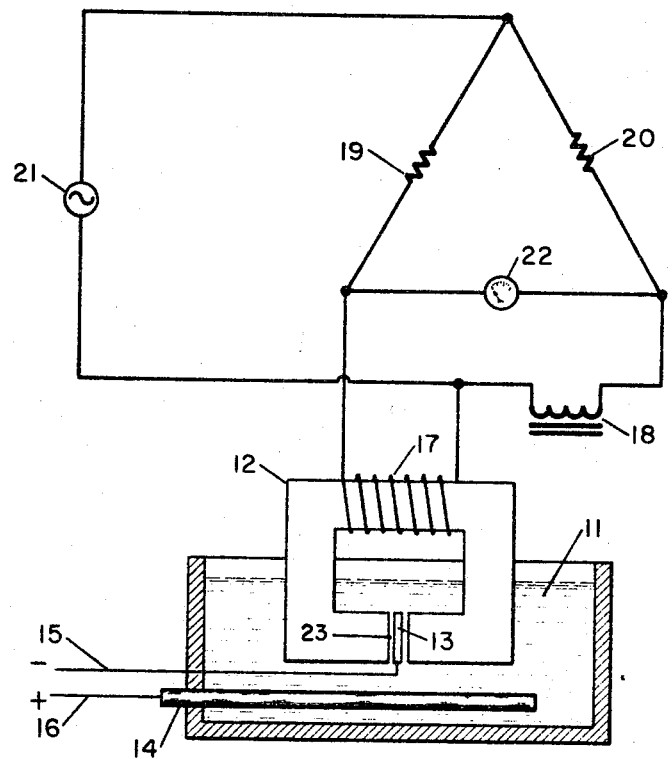
FIGURE 1 is a schematic illustration of the device of the invention, in its simplest form, in combination with suitable readout means.

Referring now to FIGURE 1 in detail the device includes electrolytic bath 11 in which are immersed magnetic core 12, non-magnetic electrode 13, and ferromagnetic electrode 14.

Bath 11 contains a dissolved salt of a ferromagnetic element. A suitable example of electrolytic bath is an aqueous solution of ferrous ammonium sulfate to which a small amount of sulphuric acid has been added. Other ferromagnetic elements include cobalt, nickel, the rare earth elements and the actinide series of elements. A solution of a salt of any one of these elements is a suitable electrolytic bath for the purposes of the invention.

Magnetic core or loop 12 is preferably soft iron; however, any other ferromagnetic metal is also suitable. The immersed arms of core 12 are coated with an insulating and waterproofing material, for example, ordinary lacquer or an epoxy resin coating. Air gap 23 in core 12 is very narrow, the width of which is of the same order of magnitude as the gap found in magnetic recording heads. Suitable widths for the purpose of this invention lie within the range 0.0005 to 0.1 inch, and preferably within the range of 0.001 to .01 inch.

Electrode 13 is located within air gap 23 of core 12. As a practical matter, electrode 13 will normally be a thin, flat, non-magnetic piece of metal which will substantially fill the air gap. FIGURE 1, being a schematic illustration, shows electrode 13 to be in contact with bath 11 on all sides thereof. In actual practice, however, it is adequate to provide an electrode 13 which wedges tightly within the air gap, whereby only the periphery thereof comes in contact with the electrolytic bath. In such an arrangement the electrodeposition of ferromagnetic metal on electrode 13 will occur only at the periphery thereof. This is entirely suitable, and from a practical standpoint is preferred. Examples of suitable non-magnetic materials for electrode 13 include silver, gold, platinum, copper, and others. A carbon electrode is also suitable.

Electrode 14 is composed of a ferromagnetic metal. The metal of electrode 14 will normally be the same as the ferromagnetic element a salt of which is dissolved in bath 11. However, a different ferromagnetic metal is nevertheless operable.

In operation terminal 15 is the negative terminal of the cell, making electrode 13 the cathode. Terminal 16 is positive, making electrode 14 the anode. A direct current signal, or series of signals, to be integrated and stored is supplied to the terminals of the device whereby ferromagnetic metal is deposited on electrode 13. The amount of metal deposited is proportional to the total current passed through the cell. The electroplated metal will, in turn, increase the magnetic susceptibility of core 12 an amount which is proportional to the time integral of the signal or signals applied to the terminals of the device.

Readout means for measuring and indicating the degree of change of magnetic susceptibility of core 12 includes sensing coil 17 wound about core 12. A bridge circuit composed of coil 17, reference coil 18 and resistors 19 and 20 is supplied with an A.C. input bias from alternating current source 21. Since resistors 19 and 20 are equal, ammeter 22 will indicate zero current only if the inductances of coils 17 and 18 are equal. Accordingly, reference coil 18 is adjusted whereby the inductance thereof is equal to the inductance of coil 17 before the deposition of any ferromagnetic metal on electrode 13. Therefore, after the deposition of metal on electrode 13, the passage of current through ammeter 22 becomes proportional to the change in inductance of coil 17, which is proportional to the amount of ferromagnetic metal deposited on electrode 13, which is in turn proportional to the time integral of the signal or signals supplied to terminals 15 and 16 of the device.

The ferromagnetic plate is readily removed from electrode 13 and restored to electrode 14 by supplying a D.C. voltage to terminals 15 and 16 with a polarity opposite that of the normal operation described above. A clean separation of the plate metal requires that the metal of electrode 13 lie below the ferromagnetic plate metal in the Electromotive Force Series of the elements, and that the voltage supplied be insufficient to cause erosion of electrode 13. For example, electrode 13 may be silver, having a Standard Electrode Potential of −.08 volt, used in combination with a ferrous salt bath and an iron electrode 14 which has a Standard Electrode Potential of +0.44 volt.

Figure 2:
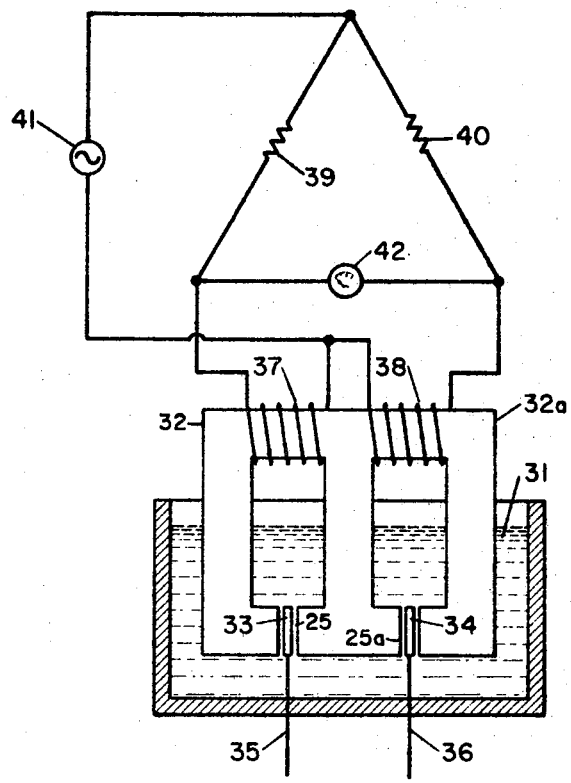
FIGURE 2 is a schematic illustration of a preferred embodiment of the device of the invention, also in combination with suitable readout means.

Referring now to FIGURE 2, the apparatus includes electrolytic bath 31 which is a 20% solution of ferrous ammonium sulfate in water to which sufficient sulfuric acid has been added to provide a pH of 5.0. Immersed in the bath are a balanced pair of magnetic circuits 32 and 32a. In the preferred embodiment shown the magnetic circuits are composed of twin soft iron cores the central arm of which is shared by the two circuits. The two magnetic loops need not be joined in this manner however, as a pair of separate and equal magnetic circuits would also be suitable. The immersed portions of magnetic loops 32 and 32a are provided with narrow air gaps 25 and 25a, respectively. Also immersed in the bath and located within the narrow air gaps are a pair of non-magnetic electrodes 33 and 34. The width of air gaps 25 and 25a and the dimensions of the electrodes are the same as discussed in connection with the corresponding parts of the embodiment of FIGURE 1. In this embodiment electrodes 33 and 34 are composed of copper. Other non-magnetic materials are also suitable, including silver, gold and platinum. The immersed portions of the magnetic core circuits are coated with an insulating and waterproofing material as before.

As an initial step in the operation of the device, electrodes 33 and 34 are prepared for use by the temporary immersion of a ferromagnetic electrode, for example an iron electrode (not shown) into the electrolytic bath. By the application of a current to terminals 35 and 36 as cathodes, and to the temporary iron electrode as anode, a thin plate of iron is deposited on electrodes 33 and 34. Since the amount of iron plate transferred to each of electrodes 33 and 34 is equal, the balance of magnetic circuit pair 32 is undisturbed.

The device is now ready for the application of an input signal or series of signals to be integrated and stored in accordance with the invention. The signal is supplied to terminal leads 35 and 36. Either terminal may be positive and the other negative. The input signal causes the electrochemical transfer of iron from one electrode of the magnetic balance to the other, and the amount transferred is a function of the input signal or series of signals and the duration for which it is applied. This imbalance introduced is the time integral of the input signal or signals.

Readout means for detecting and measuring the extent of imbalance includes sensing coils 37 and 38 wound on equivalent arms of the balanced pair of magnetic core circuits. A bridge circuit including coils 37 and 38 and equal resistances 39 and 40 is supplied with an A.C. input bias signal from A.C. source 41. Ammeter 42 registers zero current, therefore, only when the inductances of coils 37 and 38 are equal. The transfer of iron plate from electrode 33 to electrode 34, or vice versa, increases the inductance of the coil in that circuit to which iron is transferred, and reduces the inductance of that circuit from which iron plate is transferred. The extent of this imbalance is proportional to the time integral of the input signal applied to terminals 35 and 36 and is indicated quantitatively by the flow of current through ammeter 42.

It is interesting to note that reference coil 18 of the embodiment of FIGURE 1 has been replaced in the embodiment of FIGURE 2 by a matched and balanced magnetic circuit immersed in the electrolytic bath. The principal advantage of this modification arises from the fact that for a given signal or a series of signals the difference between the inductance levels of coils 37 and 38 will be double the difference between the inductances of coils 17 and 18 in the embodiment of FIGURE 1. Accordingly, the sensitivity of the preferred embodiment shown in FIGURE 2 is double that of the embodiment of FIGURE 1. The embodiment of FIGURE 2 is also readily restored to its original state, by supplying a D.C. voltage to terminals 35 and 36 with a polarity opposite that of the normal operation. An exact balance of the magnetic circuits is again indicated by a zero reading on ammeter 42.

Figure 3:
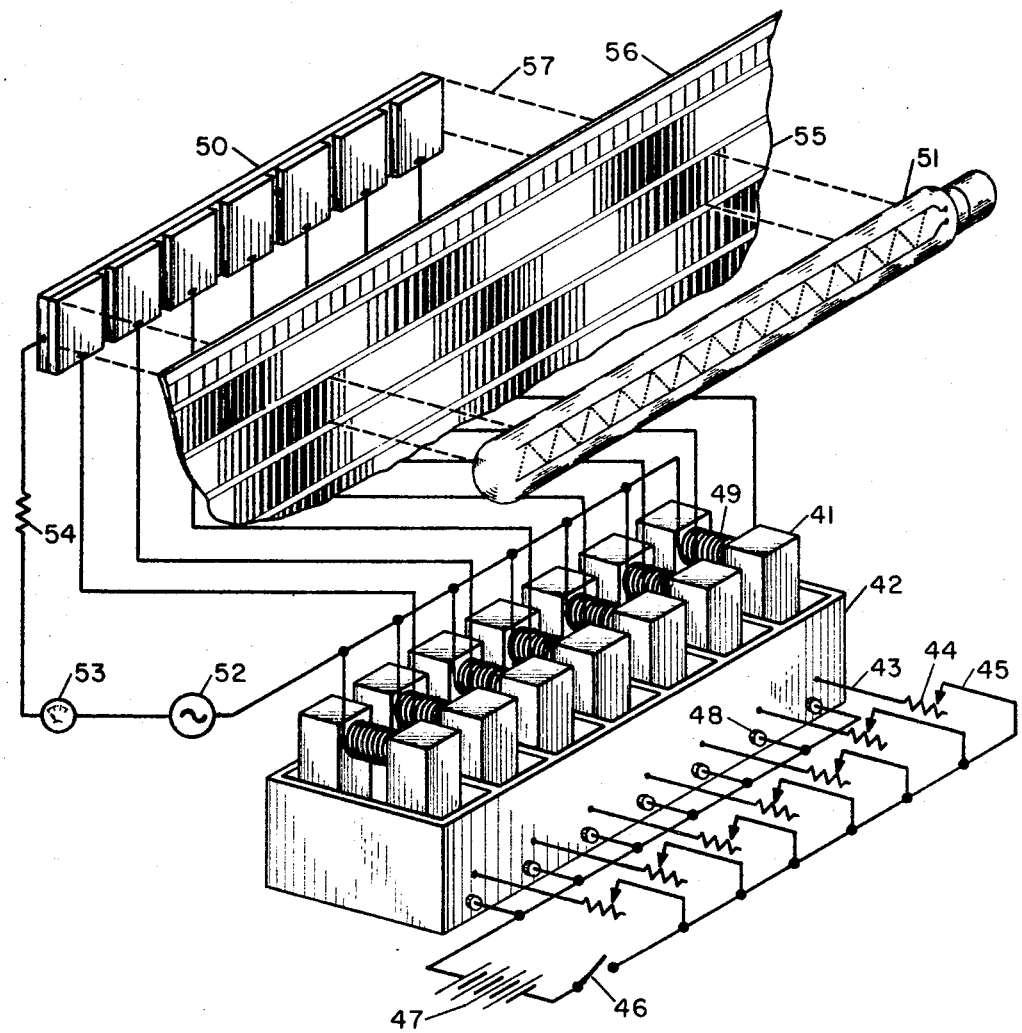
FIGURE 3 is an isometric view of a multiple array of integrating devices similar to that shown in FIGURE 1, in combination with apparatus for illustrating a system of practical application for the invention in multiple array form.

Referring now to FIGURE 3, the apparatus shown includes a multiple array of integrating and storage devices corresponding to the embodiment shown in FIGURE 1. Magnetic core 41 is one of seven equivalent cores, each of which is provided with a narrow air gap immersed in an electrolytic bath held by container 42. Within each air gap is located a non-magnetic electrode corresponding to electrode 13 of the embodiment of FIGURE 1. Lines 43 connect these electrodes in series with each of seven variable resistance elements 44. The adjustable terminals of resistance elements 44 are joined in parallel by leads 45 and connected, through switch 46, to the negative terminal of battery 47, or other source of direct current. Magnetic electrodes 48 are joined in parallel and connected to the positive terminal of battery 47.

In the art of seismic prospecting, subterranean geological features are explored by a conventional technique which involves the preparation of a seismic section. A final step in preparing a multiple trace variable density seismic section is to align the individual traces in proper side-by-side relationship. Such alignment is accomplished utilizing a multiple array of devices of the invention in accordance with the following procedure.

In the initial, or "adapt" cycle of operation, resistance elements 44 are adjusted to represent values corresponding to the amplitudes of a series of seismic signals to be stored in magnetic circuits 41. Switch 46 is temporarily closed whereby a certain fraction of the total current supplied from 47 passes through each of electrodes 48 and the corresponding non-magnetic electrodes located in the air gaps of immersed magnetic cores 41. Accordingly, the amount of electroplate deposited on each cathode is proportional to the signal represented by the setting of each corresponding resistance element 44.

The array of electrolytic cells and magnetic circuits is now ready for the "performance" cycle of operation, which involves the use of apparatus comprising a series of sensing coils 49, a multiple array of photoconductive detectors 50, or other photocells, and elongated light source. One terminal of each photocell is connected to a corresponding terminal of each of coils 49. A source of alternating current 52 is connected between the remaining terminals of coils 49 and the remaining terminals of the photocell array, through ammeter 53 and resistance 54. A suitable example of a multiple array of photocells is the Silicon Photocell Readout Matrix, described in bulletin SR–278–A of the International Rectifier Corporation of El Segundo, California.

A single trace 55 of multiple trace variable density seismic section 56 is placed in alignment with, and between light source 51 and photocell array 50, whereby the conductivity response of each photocell, being directly proportional to the intensity of light which strikes it, is therefore inversely proportional to the density of that portion of trace 55 through which light from source 51 passed before striking the cell. A maximum conductivity of a particular photocell, combined with a minimum inductance of the coil in series therewith, permits a maximum flow of current. Accordingly, when each photocell-coil pair is matched to provide a maximum flow of current, then the summation of currents registered by ammeter 53 also reaches a maximum. Therefore, by shifting trace 55 laterally within light path 57, a position of the trace is found which causes a maximum reading of ammeter 53. This position corresponds to the desired alignment of trace 55 with the series of values initially represented by the settings of resistance elements 44.

Similarly as in FIGURE 3, a plurality of devices as shown in FIGURE 2 is also readily combined in multiple array form.

Numerous other embodiments and applications of the invention will readily occur to those skilled in the art. Accordingly, it is intended that no limitation be imposed on the scope of the invention other than as recited in the appended claims.

What is claimed is:

1. An electronic device comprising a solution of a salt of a ferromagnetic element; a ferromagnetic core having an electrically insulated portion thereof immersed in said solution; said immersed portion having a narrow gap therein; a non-magnetic electrode positioned at least partially within said gap; and a ferromagnetic electrode also immersed in said solution.

2. A plurality of devices as defined by claim 1, in combination with a like plurality of variable resistance elements and a source of direct current, said ferromagnetic electrodes being joined in parallel and electrically connected to the positive terminal of said direct current source, each of said non-magnetic electrodes being electrically connected in series, respectively, with said variable resistance elements, and the adjustable terminals of said resistance elements being joined in parallel and electrically connected to the negative terminal of said direct current source.

3. Apparatus as defined by claim 1, further comprising means for measuring the magnetic susceptibility of said core.

4. A plurality of devices as defined by claim 3, in combination with a like plurality of variable resistance elements and a source of direct current, said ferromagnetic electrodes being joined in parallel and electrically connected to the positive terminal of said direct current source, each of said non-magnetic electrodes being electrically connected in series, respectively, with said variable resistance elements, and the adjustable terminals of said resistance elements being joined in parallel and electrically connected to the negative terminal of said direct current source.

5. A device as defined by claim 3 wherein said measuring means comprises a coil of conductor wound about a portion of said core and means for measuring the inductance of said coil.

6. A plurality of devices as defined by claim 5, in combination with a like plurality of variable resistance elements and a source of direct current, said ferromagnetic electrodes being joined in parallel and electrically connected to the positive terminal of said direct current source, each of said non-magnetic electrodes being electrically connected in series, respectively, with said variable resistance elements, and the adjustable terminals of said resistance elements being joined in parallel and electrically connected to the negative terminal of said direct current source.

7. Apparatus as defined by claim 5 wherein said inductance measuring means comprises a bridge circuit for comparing the inductance of said coil with a reference inductance.

8. A plurality of devices as defined by claim 7, in combination with a like plurality of variable resistance elements and a source of direct current, said ferromagnetic electrodes being joined in parallel and electrically connected to the positive terminal of said direct current source, each of said non-magnetic electrodes being electrically connected in series, respectively, with said variable resistance elements, and the adjustable terminals of said resistance elements being joined in parallel and electrically connected to the negative terminal of said direct current source.

9. An electrochemical integrator and signal storage circuit comprising an electrolytic bath containing a dissolved salt of a ferromagnetic element; a ferromagnetic electrode immersed in said bath; a balanced magnetic circuit having an electrically insulated portion thereof immersed in said bath, said immersed portion having a gap therein; a non-magnetic electrode positioned in said gap and also immersed in said bath; means for applying a voltage difference across said electrodes whereby the ferromagnetic element from said bath deposits on said non-magnetic electrode, and means for measuring the extent of imbalance introduced into said magnetic circuit as a result of said deposition.

10. An electrochemical integrator and signal storage unit comprising an electrolytic bath containing a dissolved salt of a ferromagnetic element; a magnetic balance comprising two substantially equal magnetic core circuits each having a narrow gap therein at least partially immersed in said bath; a non-magnetic electrode positioned in each of said gaps and also at least partially immersed in said bath; a bridge circuit comprising a pair of balanced sensing coils wound on equivalent portions of the respective cores of said balanced pair of magnetic circuits; and current measuring means in said bridge circuit, whereby the degree of any difference in magnetic susceptibility between said magnetic circuits may be determined.

11. A plurality of devices as defined by claim 10, in combination with a like plurality of variable resistance elements and a source of direct current, one electrode of each of said balanced pair of magnetic circuits being joined in parallel and electrically connected to the positive terminal of said current source, each of the remaining electrodes of each of said balanced pair of magnetic circuits being connected, respectively, in series with each of said variable resistance elements, and the adjustable terminals of each of said resistance elements being joined in parallel and electrically connected to the negative terminal of said current source.

12. An electrochemical integrator comprising an electrolytic bath containing a dissolved salt of a ferromagnetic element; a pair of ferromagnetic cores having substantially equivalent magnetic susceptibilities, each of said cores having an electrically insulated portion thereof immersed in said bath, each of said immersed portions having a short gap therein; and two non-magnetic electrodes positioned, respectively, at least partially within said gaps.

13. A plurality of devices as defined by claim 12, in combination with a like plurality of variable resistance elements and a source of direct current, one electrode of each of said balanced pair of magnetic circuits being joined in parallel and electrically connected to the positive terminal of said current source, each of the remaining electrodes of each of said balanced pair of magnetic circuits being connected, respectively, in series with each of said variable resistance elements, and the adjustable terminals of each of said resistance elements being joined in parallel and electrically connected to the negative terminal of said current source.

References Cited by the Examiner

UNITED STATES PATENTS

| | | | |
|---|---|---|---|
| 2,832,046 | 4/1958 | Rezek | 324—98 |
| 2,878,444 | 3/1959 | Feher | 324—34 |
| 2,933,677 | 4/1960 | Lieber | 324—34 |
| 2,993,169 | 7/1961 | Polye | 324—68 |

WALTER L. CARLSON, *Primary Examiner.*

FREDERICK M. STRADER, *Examiner.*

C. W. HOFFMANN, M. J. LYNCH,
*Assistant Examiners.*